United States Patent
Yeo

(10) Patent No.: US 10,099,686 B2
(45) Date of Patent: Oct. 16, 2018

(54) LIMP-HOME DRIVING METHOD DURING BREAKDOWN OF PARKING SWITCH FOR VEHICLE

(71) Applicant: HYUNDAI MOTOR COMPANY, Seoul (KR)

(72) Inventor: Jung Hack Yeo, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 125 days.

(21) Appl. No.: 15/259,715

(22) Filed: Sep. 8, 2016

(65) Prior Publication Data

US 2017/0106854 A1    Apr. 20, 2017

(30) Foreign Application Priority Data

Oct. 14, 2015    (KR) .................. 10-2015-0143637

(51) Int. Cl.
*B60W 20/50*    (2016.01)
*G07C 5/08*    (2006.01)
*H04L 12/40*    (2006.01)

(52) U.S. Cl.
CPC .......... *B60W 20/50* (2013.01); *G07C 5/0808* (2013.01); *G07C 5/0816* (2013.01); *H04L 12/40* (2013.01); *B60W 2300/10* (2013.01); *B60W 2510/081* (2013.01); *B60W 2510/186* (2013.01); *B60W 2550/143* (2013.01); *B60W 2710/188* (2013.01); *B60W 2720/10* (2013.01); *H04L 2012/40215* (2013.01); *Y10S 903/93* (2013.01)

(58) Field of Classification Search
CPC combination set(s) only.
See application file for complete search history.

(56) References Cited

U.S. PATENT DOCUMENTS

2014/0177199 A1    6/2014    Woo

FOREIGN PATENT DOCUMENTS

| JP | H09-104339 A | 4/1997 |
|---|---|---|
| JP | H11-34860 A | 2/1999 |
| JP | 2001-106057 A | 4/2001 |
| JP | 2002-145046 A | 5/2002 |
| JP | 2003-269215 A | 9/2003 |
| JP | 2013-203098 A | 10/2013 |
| KR | 10-2010-0012357 A | 2/2010 |
| KR | 10-1371762 B1 | 3/2014 |
| KR | 10-2015-0060075 A | 6/2015 |

OTHER PUBLICATIONS

Korean Notice of Allowance dated Dec. 5, 2016, issued in Korean Patent Application No. 10-2015-0143637.

*Primary Examiner* — Anne M Antonucci
*Assistant Examiner* — Renee LaRose
(74) *Attorney, Agent, or Firm* — McDermott Will & Emery LLP

(57) ABSTRACT

A limp-home driving method at the time of a breakdown of a parking switch for a vehicle includes a first step of diagnosing a breakdown of a plurality of air parking switches provided in a hybrid vehicle by connecting the air parking switches to a hybrid control unit (HCU) and a transmission control unit (TCU), respectively, through parking wires, and connecting the HCU and the TCU with each other by controller area network (CAN) communication, a second step of informing a driver of a breakdown state at the time of confirming the breakdown of the air parking switches in the first step, and a third step of limiting an output of the vehicle and performing a limp-home function in a state in which an ISG (Idle Stop and Go) control is stopped, after the second step.

12 Claims, 3 Drawing Sheets

LIMP-HOME DRIVING METHOD DURING BREAKDOWN OF PARKING SWITCH FOR VEHICLE

CROSS-REFERENCE TO RELATED APPLICATION

This application claims the benefit of priority to Korean Patent Application No. 10-2015-0143637, filed on Oct. 14, 2015 with the Korean Intellectual Property Office, the disclosure of which is incorporated herein in its entirety by reference.

TECHNICAL FIELD

The present disclosure relates to a limp-home driving method during a breakdown of a parking switch for a vehicle, and more particularly, to a limp-home driving method during a breakdown of a parking switch for a vehicle for enabling limp-home driving through a breakdown diagnosis by deciding a parking operation and a breakdown at the time of diagnosing a breakdown of a parking switch in a hybrid bus.

BACKGROUND

Generally, a vehicle is provided with a parking brake system preventing arbitrary movement of the vehicle and allowing the vehicle to be firmly fixed to the ground at the time and location of parking the vehicle, and the parking brake system is operated by a parking switch assembly installed in the vehicle.

Meanwhile, a hybrid bus may include two air parking switches 1 and 2, as illustrated in FIG. 1, and when a parking operation is performed in the hybrid bus, required torques (a motor torque and an engine torque) are made to become 0, such that power is not generated.

An air parking switch is connected to a hybrid control unit (HCU) controlling an ISG (Idle Stop and Go) and a torque, a transmission control unit (TCU) for learning and gear engagement, and a cluster of a parking operation.

However, a parking brake of the hybrid bus according to the related art may be recognized through the air parking switch mounted on an air line. However, when a breakdown occurs in the air parking switch or foreign materials are introduced into the air line or moisture is introduced into wiring, such that a short-circuit is generated, the HCU connected to the air parking switch registers that parking is completed in a situation in which the parking is not actually completed to make the motor torque and the engine torque 0 through a parking mode, such that a vehicle stop is maintained even at the time of desired acceleration, thereby making driving impossible.

SUMMARY

The present disclosure has been made to solve the above-mentioned problems occurring in the prior art while advantages achieved by the prior art are maintained intact.

An aspect of the present disclosure provides a limp-home driving method at the time of a breakdown of a parking switch for a vehicle for enabling limp-home driving through a breakdown diagnosis by deciding a parking operation and a breakdown at the time of diagnosing a breakdown of a parking switch in a hybrid bus.

According to an exemplary embodiment of the present disclosure, a limp-home driving method at the time of a breakdown of a parking switch for a vehicle includes: a first step of diagnosing a breakdown of a plurality of air parking switches provided in a hybrid vehicle by connecting the air parking switches to a hybrid control unit (HCU) and a transmission control unit (TCU), respectively, through parking wires, and connecting the HCU and the TCU with each other by controller area network (CAN) communication; a second step of informing a driver of a breakdown state at the time of confirming the breakdown of the air parking switches in the first step; and a third step of limiting an output of the vehicle and performing a limp-home function in a state in which an ISG (Idle Stop and Go) control is stopped, after the second step.

The TCU may include a gradient sensor to determine a gradient of a road on which the vehicle is positioned.

The first step may include: a 1-1-th step of deciding whether or not a vehicle speed is 0 Km/h or less and whether a revolution per minute (RPM) is 200 or less; and a 1-2-th step of deciding whether or not the gradient of the road is lower than a set value of a capacity of an anti-lock brake system (ABS) provided in the vehicle and whether an air amount of the air parking switches exceeds 50% when conditions are satisfied in the 1-1-th step.

When conditions are satisfied in the 1-2-th step, a process may proceed to the first step to diagnose the breakdown of the air parking switches, and when the conditions are not satisfied in the 1-2-th step, the process may return to the 1-1-th step.

When the conditions are not satisfied in the 1-1-th step, the process may proceed to a 1-3-th step of deciding whether or not the CAN communication with the parking wires is normal.

When it is decided that the CAN communication is normal in the 1-3-th step, the process may proceed to a 1-4-th step of deciding whether or not a foot brake displacement is less than 0%, whether an auxiliary brake switch is turned off, and whether a vehicle deceleration exceeds 0.15 G.

When conditions are satisfied in the 1-4-th step, the process may proceed to a 1-4-1-th step of deciding that the driver has actually operated a parking brake, and ends a logic.

When conditions are not satisfied in the 1-4-th step, the process may proceed to a 1-5-th step of deciding whether or not the parking wires are normal and whether the CAN communication is abnormal.

When conditions are not satisfied in the 1-5-th step, the process may proceed to a 1-6-th step of deciding whether or not the parking wires are abnormal and whether the CAN communication is normal.

When conditions are satisfied in the 1-5-th step and the 1-6-th step, the process may proceed to a 1-7-th step of deciding whether the air parking switches are abnormal.

The process may proceed to a 1-8-th step of diagnosing a short-circuit of the air parking switches and proceeding to the third step after the 1-7-th step.

When conditions are not satisfied in the 1-6-th step, the process may return to the 1-1-th step.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Exemplary embodiments of the present disclosure will be described in detail with reference to the accompanying drawings.

Figure 1:
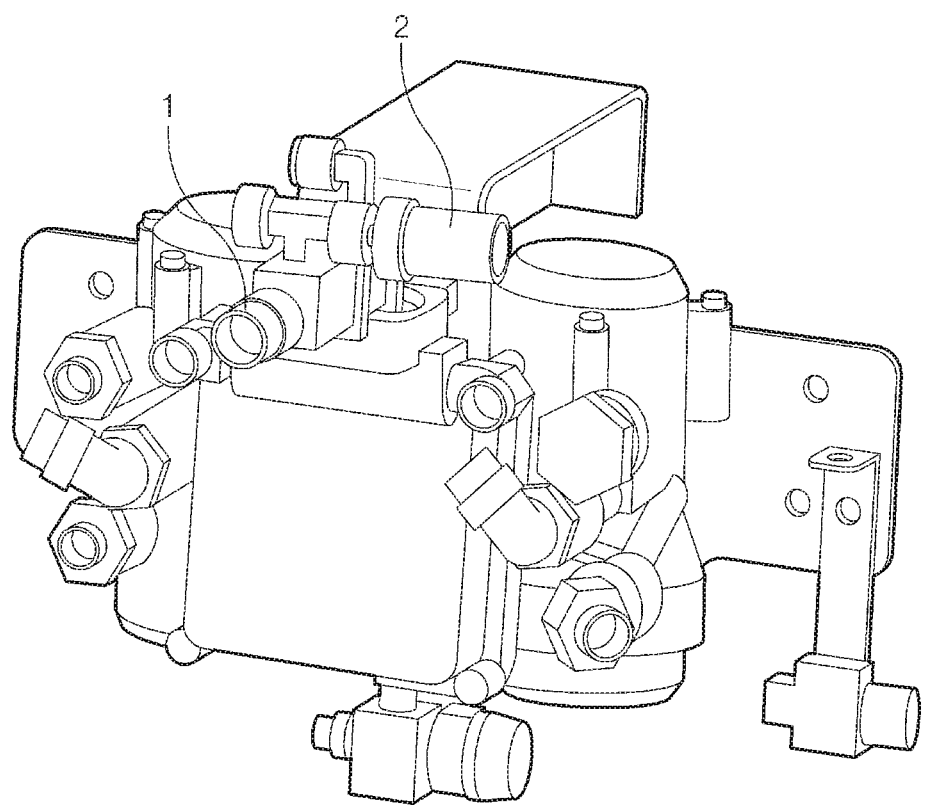
FIG. 1 is a view illustrating a parking switch for a vehicle according to the related art.
Figure 2:
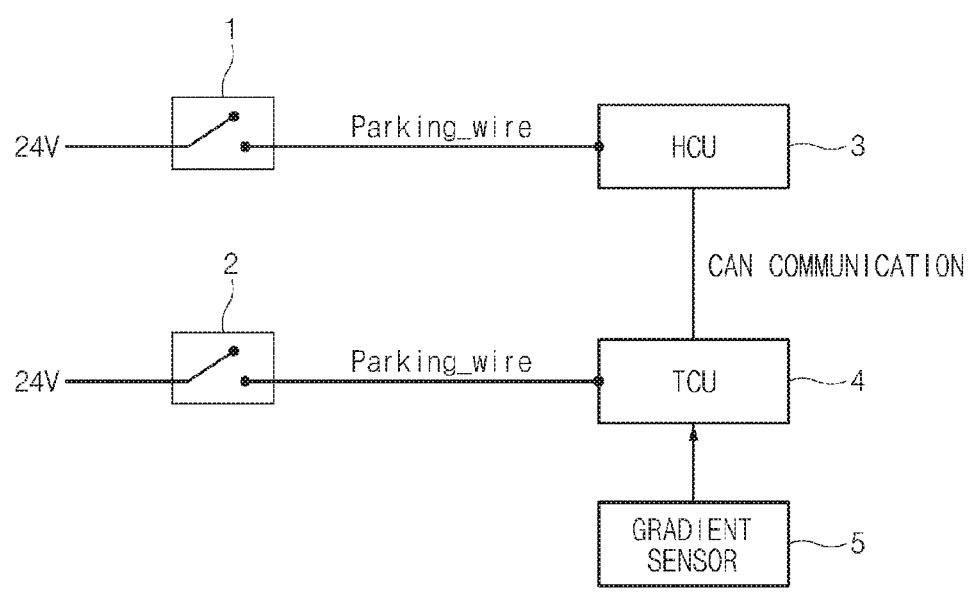
FIG. 2 is a structural view illustrating connection and controller area network (CAN) communication interworking states between an air parking switch, a hybrid control unit (HCU), and a transmission control unit (TCU) applied to a limp-home driving method at the time of a breakdown of a parking switch for a vehicle according to an exemplary embodiment of the present disclosure.
Figure 3:
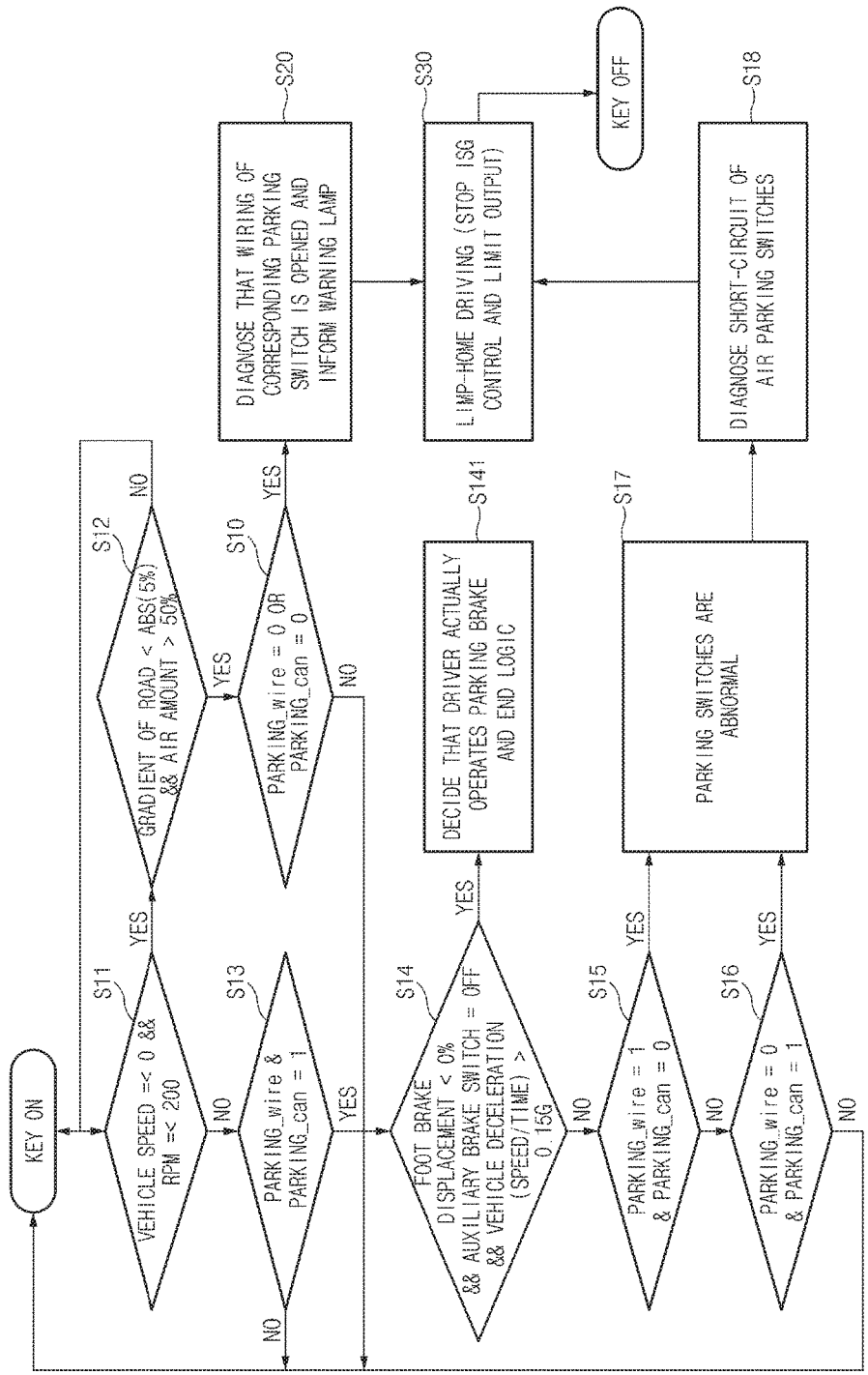
FIG. 3 is a flow chart illustrating a limp-home driving method at the time of a breakdown of a parking switch for a vehicle according to an exemplary embodiment of the present disclosure.

A limp-home driving method at a time of a breakdown of a parking switch for a vehicle according to an exemplary embodiment of the present disclosure may include a first step (S10) of diagnosing a breakdown of air parking switches 1 and 2, a second step (S20) of informing a driver of a breakdown state at the time of confirming the breakdown, and a third step (S30) of performing a limp-home function, as illustrated in FIGS. 2 and 3.

In the first step (S10), the breakdown of the air parking switches 1 and 2 may be diagnosed.

Here, the breakdown of a plurality of air parking switches 1 and 2 provided in a hybrid vehicle may be diagnosed by connecting the air parking switches 1 and 2 to a hybrid control unit (HCU) 3 examining signals from the air parking switches 1 and 2 and a transmission control unit (TCU) 4, respectively, through parking wires, and connecting the HCU 3 and the TCU 4 with each other by controller area network (CAN) 5 communication, as illustrated in FIG. 2.

In addition, the TCU 4 may include a gradient sensor 5 in order to figure out a gradient of a road on which the vehicle is positioned.

As illustrated in FIG. 3, the first step (S10) may include a 1-1-th step (S11) of deciding whether or not a vehicle speed is 0 Km/h or less and whether a revolution per minute (RPM) is 200 or less and a 1-2-th step (S12) of deciding whether or not a gradient of the road is lower than a set value (5%) of a capacity of an anti-lock brake system (ABS) provided in the vehicle and whether an air amount of the air parking switches 1 and 2 exceeds 50% when conditions are satisfied in the 1-1-th step (S11).

Here, when conditions are satisfied in the 1-2-th step (S12), a process may proceed to the first step (S10) to diagnose the breakdown of the air parking switches 1 and 2, and when the conditions are not satisfied in the 1-2-th step (S12), the process may return to the 1-1-th step (S11).

The second step (S20) may be a step of informing the driver of a breakdown state at the time of confirming the breakdown of the air parking switches 1 and 2 in the first step (S10).

Here, a warning lamp of the HCU 3 on an instrument panel may be used or a separate character or voice notification may be used in order to inform the driver of the breakdown state.

The third step (S30) may be a step of limiting an output of the vehicle and performing the limp-home function in a state in which an ISG (Idle Stop and Go) control is stopped to enable minimum driving, after the second step (S20).

Meanwhile, when the conditions are not satisfied in the 1-1-th step (S11), which may be a breakdown diagnosing step, the process may proceed to a 1-3-th step (S13) of deciding whether at least one of the signals from the air parking switches is 1.

Here, when it is decided that the at least one of the signals from the air parking switches is 1 in the 1-3-th step (S13), the process may proceed to a 1-4-th step (S14) of deciding whether or not foot brake displacement is less than 0%, whether an auxiliary brake switch is turned off, and whether a vehicle deceleration exceeds 0.15 G.

When conditions are satisfied in the 1-4-th step (S14), the process may proceed to a 1-4-1-th step of deciding that the driver actually has operated a parking brake, and ends a logic.

In addition, when the conditions are not satisfied in the 1-4-th step (S14), the process may proceed to a 1-5-th step (S15) of deciding whether or not the signal from the parking switch connected to the HCU is 1 and whether the signal from the parking switch connected to the TCU delivered through the CAN communication is 0 which indicates that the parking switch is off, and when conditions are not satisfied in the 1-5-th step (S15), the process may proceed to a 1-6-th step (S16) of deciding whether or not the signal from the parking switch connected to the HCU is 0 and whether the signal from the parking switch connected to the TCU delivered through the CAN 5 communication is 1.

Here, when conditions are satisfied in the 1-5-th step (S15) or the 1-6-th step (S16), the process may proceed to a 1-7-th step (S17) of deciding that the correct signal of the air parking switches 1 and 2 are 0.

When it is decided that the air parking switches 1 and 2 are abnormal in the 1-7-th step (S17), the process may proceed to a 1-8-th step (S18) of diagnosing the air parking switch which transmits the signal of 1 is a short-circuit and enabling the limp-home driving through connection to the third step (S30).

Here, when the conditions are not satisfied in the 1-6-th step (S16), the process may return to the 1-1-th step (S11).

As described above, the limp-home driving method at the time of a breakdown of a parking switch for a vehicle according to an exemplary embodiment of the present disclosure may include the first step (S10) of diagnosing the breakdown of the plurality of air parking switches 1 and 2 provided in the hybrid vehicle by connecting the air parking switches 1 and 2 to the HCU 3 and the TCU 4, respectively, through the parking wires, and connecting the HCU 3 and the TCU 4 with each other by the CAN communication, the second step (S20) of informing the driver of the breakdown state at the time of confirming the breakdown of the air parking switches 1 and 2 in the first step (S10), and the third step (S30) of limiting the output of the vehicle and performing the limp-home function in a state in which the ISG control is stopped, after the second step (S20).

As described above, according to the exemplary embodiment of the present disclosure, a problem that the vehicle may not move in the case in which a situation that is not parking is erroneously recognized as a parking situation due to the short-circuit of the air parking switches 1 and 2 is solved, and a malfunction generated at the time of a breakdown of connectors or switches of the air parking switches 1 and 2 is prevented, and a breakdown mode problem is solved by complementing a logic without adding hardware, thereby making it possible to improve marketability and convenience.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A limp-home driving method at the time of a breakdown of a parking switch for a vehicle, comprising:
   a first step of diagnosing a breakdown of a plurality of air parking switches provided in a hybrid vehicle by a hybrid control unit (HCU) examining signals from the air parking switches;
   a second step of informing a driver of a breakdown state by warning lamp of the HCU at the time of confirming the breakdown of the air parking switches in the first step; and
   a third step of performing a limp-home function by stopping an ISG (Idle Stop and Go) control and limiting an output of the vehicle by the HCU, after the second step,
   wherein the HCU is connected to a transmission control unit (TCU) by a controller area network (CAN) communication, and
   wherein the air parking switches are connected to the HCU and the TCU through parking wires respectively.

2. The limp-home driving method at the time of a breakdown of a parking switch for a vehicle according to claim 1, wherein the TCU includes a gradient sensor for determining a gradient of a road on which the vehicle is positioned.

3. The limp-home driving method at the time of a breakdown of a parking switch for a vehicle according to claim 2, wherein the first step includes:
   a 1-1-th step of deciding whether or not a vehicle speed 12 is 0 Km/h or less and whether a revolution per minute (RPM) is 200 or less; and
   a 1-2-th step of deciding whether or not the gradient of the road is lower than a set value of a capacity of an anti-lock brake system (ABS) provided in the vehicle and whether an air amount of the air parking switches exceeds 50% when conditions are satisfied in the 1-1-th step.

4. The limp-home driving method at the time of a breakdown of a parking switch for a vehicle according to claim 3, herein when conditions are satisfied in the 1-2-th step, a process proceeds to the first step to diagnose the breakdown of the air parking switches, and when the conditions are not satisfied in the 1-2-th step, the process returns to the 1-1-th step.

5. The limp-home driving method at the time of a breakdown of a parking switch for a vehicle according to claim 3, wherein when the conditions are not satisfied in the 1-1-th step, the process proceeds to a 1-3-th step of deciding whether at least one of the signals from the air parking switches is 1 which indicates that the parking switch is on.

6. The limp-home driving method at the time of a breakdown of a parking switch for a vehicle according to claim 5, wherein when it is decided that the at least one of the signals from the air parking switches is 1 in the 1-3-th step, the process proceeds to a 1-4-th step of deciding whether or not a foot brake displacement is less than 0%, whether an auxiliary brake switch is turned off, and whether a vehicle deceleration exceeds 0.15 G.

7. The limp-home driving method at the time of a breakdown of a parking switch for a vehicle according to claim 6, wherein when conditions are satisfied in the 1-4-th step, the process proceeds to a 1-4-1-th step of deciding that the driver actually has operated a parking brake, and ends a logic.

8. The limp-home driving method at the time of a breakdown of a parking switch for a vehicle according to claim 6, wherein when conditions are not satisfied in the 1-4-th step, the process proceeds to a 1-5-th step of deciding whether or not the signal from the parking switch connected to the HCU is 1 and whether the signal from the parking switch connected to the TCU delivered through the CAN communication is 0 which indicates that the parking switch is off.

9. The limp-home driving method at the time of a breakdown of a parking switch for a vehicle according to claim 8, wherein when conditions are not satisfied in the 1-5-th step, the process proceeds to a 1-6-th step of deciding whether or not the signal from the parking switch connected to the HCU is 0 and whether the signal from the parking switch connected to the TCU delivered through the CAN communication is 1.

10. The limp-home driving method at the time of a breakdown of a parking switch for a vehicle according to claim 9, wherein when conditions are satisfied in the 1-5-th step or the 1-6-th step, the process proceeds to a 1-7-th step of deciding the correct signal of the air parking switches are 0.

11. The limp-home driving method at the time of a breakdown of a parking switch for a vehicle according to claim 10, wherein the process proceeds to a 1-8-th step of diagnosing the air parking switch which transmits the signal of 1 is a short-circuit and proceeds to the third step after the 1-7-th step.

12. The limp-home driving method at the time of a breakdown of a parking switch for a vehicle according to claim 9, wherein when conditions are not satisfied in the 1-6-th 15 step, the process returns to the 1-1-th step.

* * * * *